(12) United States Patent
Besch

(10) Patent No.: US 9,532,679 B1
(45) Date of Patent: Jan. 3, 2017

(54) CAMP FIRE AID SYSTEM

(71) Applicant: Frederick M. Besch, Tampa, FL (US)

(72) Inventor: Frederick M. Besch, Tampa, FL (US)

(*) Notice: Subject to any disclaimer, the term of this patent is extended or adjusted under 35 U.S.C. 154(b) by 908 days.

(21) Appl. No.: 13/758,893

(22) Filed: Feb. 4, 2013

(51) Int. Cl.
- F24B 3/00 (2006.01)
- A47J 37/07 (2006.01)
- A47J 33/00 (2006.01)

(52) U.S. Cl.
CPC ..................... *A47J 33/00* (2013.01)

(58) Field of Classification Search
CPC ............................ A47J 33/00; F24B 1/193
USPC ................ 126/152 R, 25 R, 29, 30, 540
See application file for complete search history.

(56) References Cited

U.S. PATENT DOCUMENTS

| 4,690,125 A * | 9/1987 | Beller ................ A47J 37/0704 126/1 F |
| 7,766,004 B1 * | 8/2010 | Bourgeois ............... A47J 36/26 126/25 R |
| 2010/0326423 A1 * | 12/2010 | Dupont .................. F24B 1/193 126/540 |
| 2013/0068210 A1 * | 3/2013 | Koelzer ................. F24B 1/193 126/152 B |

* cited by examiner

Primary Examiner — Avinash Savani
Assistant Examiner — Vivek Shirsat

(57) ABSTRACT

Each of a plurality of 7-shaped rods has a short leg above and a long leg below with an acute angle between the short leg and the long leg. A circular large loop is positionable in a first plane in contact with and welded to the lower ends the rods. A circular small loop is positionable in a second plane parallel with the first plane. The small loop is coupled to the rods adjacent to the acute angles. An axis extends through the centers of the loops.

1 Claim, 2 Drawing Sheets

CAMP FIRE AID SYSTEM

BACKGROUND OF THE INVENTION

Field of the Invention

The present invention relates to a camp fire aid system and more particularly pertains to supporting logs in an orientation to facilitate burning, for creating a chimney effect through flames of a burning camp fire, and for providing a support surface for cooking over the flames of the camp fire, the log supporting and the chimney creating and the support surface providing being done in a safe, convenient and economical manner.

SUMMARY OF THE INVENTION

In view of the disadvantages inherent in the known types of fire aid systems now present in the prior art, the present invention provides an improved camp fire aid system. As such, the general purpose of the present invention, which will be described subsequently in greater detail, is to provide a new and improved camp fire aid system and method which has all the advantages of the prior art and none of the disadvantages.

To attain this, the present invention essentially comprises a camp fire aid system. A plurality of similarly configured rods, each rod having a 7-shaped configuration with a short leg above and a long leg below with acute angles formed between the short leg and the long leg. Each rod has an upper end and a lower end. A circular large loop is positionable in a first plane in contact with and welded to the lower ends the rods. A circular small loop is positionable in a second plane parallel with the first plane. The small loop is coupled to the rods adjacent to the acute angles. An axis extends through the centers of the loops.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved camp fire aid system which has all of the advantages of the prior art fire aid systems and none of the disadvantages.

It is another object of the present invention to provide a new and improved camp fire aid system which may be easily and efficiently manufactured and marketed.

It is further object of the present invention to provide a new and improved camp fire aid system which is of durable and reliable constructions.

An even further object of the present invention is to provide a new and improved camp fire aid system which is susceptible of a low cost of manufacture with regard to both materials and labor, and which accordingly is then susceptible of low prices of sale to the consuming public, thereby making such camp fire aid system economically available to the buying public.

Lastly, it is an object of the present invention to provide a new and improved camp fire aid system to support logs in an orientation to facilitate burning, for creating a chimney effect through flames of a burning camp fire, and for providing a support surface for cooking over the flames of the camp fire, the log supporting and the chimney creating and the support surface providing being done in a safe, convenient and economical manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
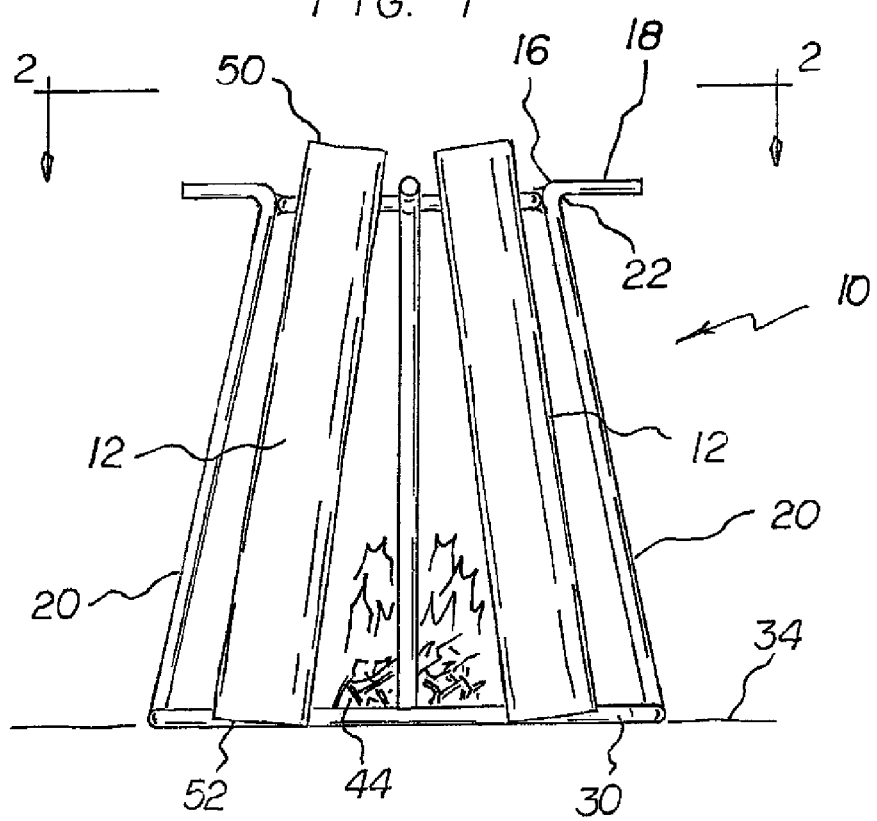
FIG. 1 is a front elevational view of a camp fire aid system constructed in accordance with the principles of the present invention.
Figure 2:
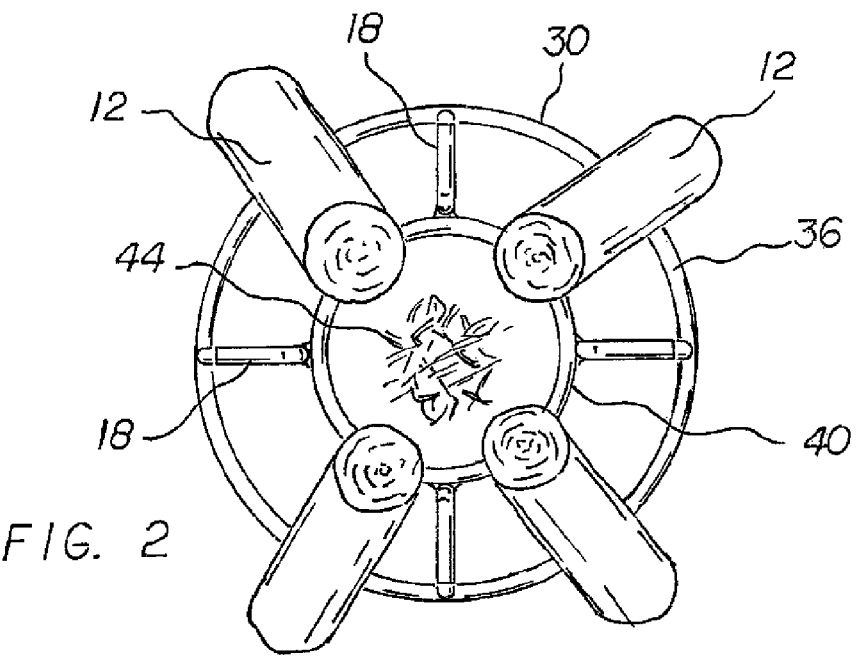
FIG. 2 is a plan view of the system taken along line 2-2 of FIG. 1.
Figure 3:
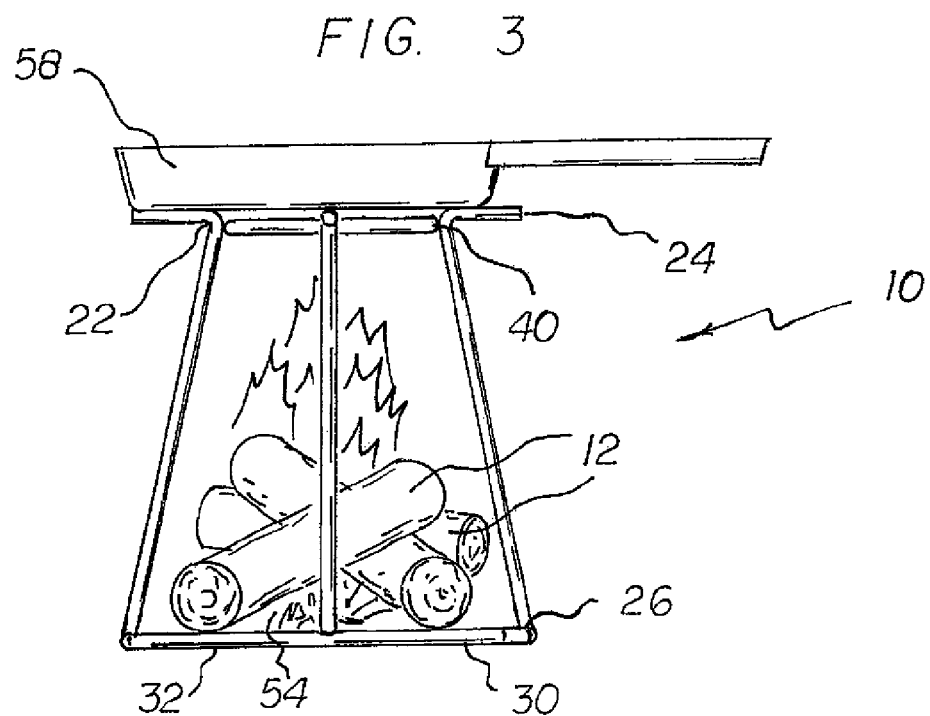
FIG. 3 is a plan view similar to FIG. 1 but with a frying pan supported thereupon.
Figure 4:
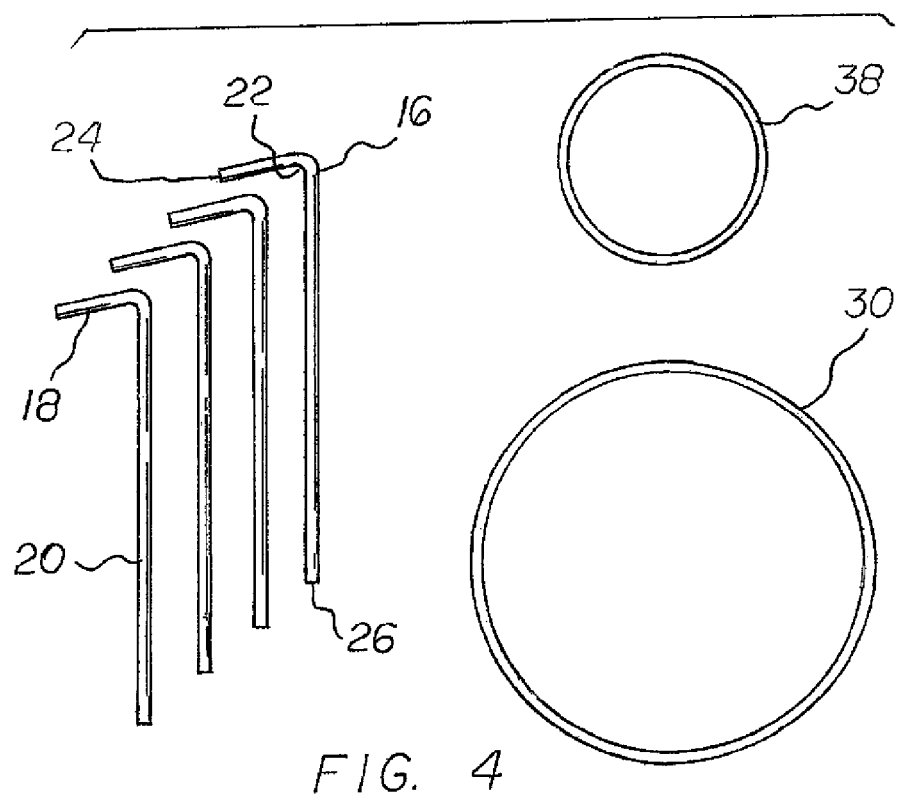
FIG. 4 is a front elevational view of the component elements of the system.

With reference now to the drawings, and in particular to FIG. 1 thereof, the preferred embodiment of the new and improved camp fire aid system embodying the principles and concepts of the present invention and generally designated by the reference numeral 10 will be described.

The present invention, the camp fire aid system 10 is comprised of a plurality of components. Such components in their broadest context include a plurality of similarly configured rods, a circular large loop, and a circular small loop. Such components are individually configured and correlated with respect to each other so as to attain the desired objective.

First provided are four similarly configured rods 16. Each rod has a 7-shaped configuration. Each rod has a short leg 18 positionable in a horizontal plane above. Each rod has a long leg 20 positionable in a generally vertical orientation below. Each rod forms an acute angle 22 between the short leg and the long leg. The acute angle is between 72 degrees and 79 degrees. Each rod has an upper end 24. Each rod has a lower end 26. Each rod has a total length of 13 inches, plus or minus 10 percent. The long length is between 250 percent and 300 percent of the length of the short leg. Each rod is fabricated of steel. Each rod has a diameter of from 0.25 inches to 0.75 inches.

A large loop 30 is provided. The large loop is in a circular configuration. The large loop has a center. The large loop has an outside diameter of 14.0 inches, plus or minus 10 percent. The large loop has a lower surface 32. A recipient ground surface 34 is provided. The lower surface is positionable in a generally horizontal first plane on the recipient ground surface. The large loop has an upper surface 36. The upper surface is in contact with and welded to the lower ends of the rods. The large loop is fabricated of steel. The large loop has a diameter of from 0.25 inches to 0.50 inches.

A small loop 38 is provided next. The small loop is in a circular configuration. The small loop has a center. The small loop has a diameter of 6.0 inches, plus or minus 10 percent. The small loop has an exterior surface 40. The exterior surface is positionable in a generally horizontal second plane above and parallel with the first plane. The exterior surface of the small loop is in contact with and welded to each of the rods at the acute angles. The acute angles are radially exterior of the small rods. A generally vertical axis extends through the centers of the loops. The small loop is fabricated of steel. The small loop has a diameter of from 0.25 inches to 0.50 inches. Each short leg has a length of 3.5 inches, plus or minus 10 percent, thereby allowing the stacking of systems for storage and transportation purposes.

Next provided is kindling 44. The kindling is provided on the recipient ground surface radially interior of the large loop.

Further provided is a plurality of logs 12 to be burned. Each log has a top 50 and a bottom 52. The bottom of each log is positioned upon the ground recipient surface radially exterior of the large loop. Each log adjacent to the top is positioned in contact with the small loop radially exterior of the small loop. In this manner, a frusto-conical chamber is formed axially between the upper and lower loops and radially between the logs and long legs of the rods. Passageways are formed between the logs and long legs of the rods. In this manner a draft of air is created to feed a fire within the chamber. The fire is adapted to ignite and burn the logs. Logs being burned are adapted to created heated embers 54. The heated embers are of sufficient heat for cooking.

Last provided is a pan 58. The pan contains food to be cooked. The pan is positioned on the short legs above the heated embers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A camp fire aid system (10) for supporting logs (12) in an orientation to facilitate burning, for creating a chimney effect through flames of a burning camp fire, and for providing a support surface for cooking over the flames of the camp fire, the system comprising, in combination:

four similarly configured rods (16), each rod being fabricated of steel and having a diameter of from 0.25 inches to 0.50 inches, each rod having a 7-shaped configuration with a short leg (18) positioned in a first horizontal plane, each rod having a long leg (20) positioned in a generally vertical orientation below the first horizontal plane, each rod forming an acute angle (22) of between 72 degrees and 79 degrees between the short leg and the long leg, each rod having an upper end (24) and a lower end (26) with a total length of 13 inches, plus or minus 10 percent, the long length being between 250 percent and 300 percent of the length of the short leg;

a large loop (30) in a circular configuration with an outside diameter of 14.0 inches plus or minus 10 percent, the large loop having a center, the large loop having a lower surface (32) positioned in a generally horizontal plane on a recipient ground surface (34), the large loop having an upper surface (36) being in contact with and welded to the lower ends of the rods, the large loop being fabricated of steel and having a diameter of from 0.25 inches to 0.50 inches;

a small loop (38) in a circular configuration with a diameter of 6.0 inches, plus or minus 10 percent, the small loop having a center, the small loop having an exterior surface (40) positioned in a generally horizontal second plane in between the ground surface and the first plane, the exterior surface of the small loop being in contact with and welded to each of the rods at the acute angles with the acute angles radially exterior of the small loop, the small loop fabricated of steel and having a diameter of from 0.25 inches to 0.50 inches, each short leg having a length of 3.5 inches, plus or minus 10 percent, thereby allowing the stacking of systems for storage and transportation purposes;

a generally vertical axis extending through the centers of the loops;

kindling (44) on the recipient ground surface radially interior of the large loop;

a plurality of logs (12) to be burned, each log having a top (50) and a bottom (52), the bottom of each log being positioned upon the ground recipient surface radially exterior of the large loop, each log adjacent to the top being positioned in contact with the small loop radially exterior of the small loop, a frusto-conical chamber formed axially between the upper and lower loops and radially between the logs and long legs of the rods, passageways formed between the logs and long legs of the rods for creating a draft of air to feed a fire within the chamber, the fire adapted to ignite and burn the logs, logs being burned adapted to create heated embers (54) of sufficient heat for cooking; and a pan (58) containing food to be cooked, the pan being positioned on the short legs above the heated embers.

* * * * *